United States Patent [19]
Bhutani et al.

[11] Patent Number: 5,269,574
[45] Date of Patent: Dec. 14, 1993

[54] HIGH PERFORMANCE VEHICLE BUMPER

[75] Inventors: Dinesh Bhutani, Troy; James A. Crandall, Bloomfield Hills, both of Mich.

[73] Assignee: Exxon Chemical Patents Inc., Linden, N.J.

[21] Appl. No.: 981,906

[22] Filed: Nov. 23, 1992

Related U.S. Application Data

[63] Continuation of Ser. No. 834,016, Feb. 10, 1992, abandoned.

[51] Int. Cl.⁵ .............................................. B60R 19/02
[52] U.S. Cl. .................................... 293/102; 293/120; 293/132
[58] Field of Search ................ 293/120, 121, 130–137, 293/102

[56] References Cited

U.S. PATENT DOCUMENTS

| | | | |
|---|---|---|---|
| 3,779,592 | 12/1973 | Goize et al. | 293/98 |
| 4,208,069 | 6/1980 | Huber et al. | 293/102 |
| 4,457,547 | 7/1984 | Sekiyama et al. | 293/110 |
| 4,482,180 | 11/1984 | Huber et al. | 293/120 |
| 4,586,739 | 5/1986 | Loren et al. | 293/120 |
| 4,616,866 | 10/1986 | Loren et al. | 293/120 |
| 4,635,984 | 1/1987 | Loren et al. | 293/120 |
| 4,671,550 | 6/1987 | Molnar | 293/120 |
| 4,762,352 | 8/1988 | Enomoto et al. | 293/120 |
| 4,913,774 | 4/1990 | Goguelin | 162/158 |
| 4,925,224 | 5/1990 | Suniszek | 293/120 |
| 4,951,986 | 8/1990 | Hanafusa et al. | 293/120 |

FOREIGN PATENT DOCUMENTS

| | | |
|---|---|---|
| 0001176 | 3/1979 | European Pat. Off. |
| 88402414.2 | 4/1989 | European Pat. Off. |
| 91/00021 | 7/1991 | European Pat. Off. |
| 2650096 | 11/1978 | Fed. Rep. of Germany |

*Primary Examiner*—Robert R. Song
*Attorney, Agent, or Firm*—J. E. Schneider

[57] ABSTRACT

The present invention relates to a light weight, high performance bumper for automobiles and the like. It consists of an I-beam reinforced by one or more ribs which add support to the front wall. The bumper is fabricated from fiber reinforced thermoplastic or thermoset materials.

12 Claims, 3 Drawing Sheets

HIGH PERFORMANCE VEHICLE BUMPER

This is a continuation of application Ser. No. 834,016 filed Feb. 10, 1992 abandoned.

The present invention relates to a lightweight, high performance bumper for a vehicle. The bumper consists of a reinforced I-beam formed from fiber reinforced thermoplastic or thermoset resins.

BACKGROUND OF THE INVENTION

Current automotive bumper systems generally consist of a C-shaped beam which spans the vehicle front rails. Loads experienced by the beam in a low speed collision (typically 2.5 to 5.0 mph) are passed to the front rails of the vehicle. In order to prevent damage to the components protected by the bumper system, the kinetic energy is absorbed by the bumper system. Other components such as hydraulic attenuators, absorptive foams or egg-crating type parts are usually added to help dissipate system energy. Multi-step processing is required because the present bumper systems are made up of several different types of materials.

U.S. Pat. No. 4,762,352, for example, discloses a bumper assembly with a front made of fiber reinforce thermoplastic resin, a back up beam and a layer of foam between the face and the back up member. Each of these parts are made of different materials and requires a separate processing step to form the bumper.

U.S. Pat. Nos. 4,635,984, 4,586,739 and 4,616,866 teach a bumper construction having a semi-rigid resilient face and a rear mounting member. An impact absorbing foam is layered between the two pieces. During a collision, the outer face deforms and compresses the foam dissipating at least some of the energy of the impact.

U.S. Pat. No. 4,482,180 appears to disclose a bumper system which may comprise an I-beam having a resilient outer covering and one or more layes of an energy absorbing foam between the I-beam and the outer covering.

Finally, U.S. Pat. No. 4,762,352 discloses a bumper having an inner support beam with a resilient outer cover. An impact absorbing foam is placed between the beam and the cover with an air space between the cover and the foam. The back beam is a hollow tube made of fiber reinforced thermoplastic resin.

Each of these designs is made up of several different components each formed from different materials. This means that many different steps are required to produce a single unit of limited effectiveness. These multiple steps and different materials add significantly to the cost of producing each vehicle. In addition, they add to the weight of the vehicle reducing the fuel efficiency of the vehicle.

In addition, as seen in the patents discussed above, most of the currently produced composite bumper beams have cross sections which are generally "C" shaped or closed sections. The closed sections are generally square or rectangular in cross section. The use of a particular section is determined as much by production methods and material properties as it by the requirements of the design.

C-sections are particularly suited to materials that are relatively difficult to form due to such problems as material flow limitations which limit the complexity of the finished part. For example, in C-sections made from reinforced thermoplastic resins, the resin and reinforcement material flows smoothly and evenly because the section is continuous with few or no branches. If preforms are needed, they can be simple with the best possibility of accurate placement in the tool.

Hollow closed sections derive naturally from bumper sections made from welded channel or combined C-section shapes. See for example U.S. Pat. No. 3,779,592. These shapes provided the best torsional rigidity but are not the simplest or most cost effective beams to produce using high performance materials. Most high performance materials that are used in high speed production lines (e.g. one part produced every 30 to 90 seconds) required high forming pressures, high strength tooling or complicated machinery. Hollow sections have added complexity in that they require some means of forming an internal shape. This is usually accomplished by the use of tooling slides, tooling or casting cores, gas assisted molding or similar processes. These methods significantly increase the complexity of the molding process and result in a further increase in investment cost, cycle time or both.

I-beams are widely used in architecture because they can carry heavy loads per unit weight. These loads, however, must be central to the beam. I-beams cannot carry an eccentric load to the same extent that they can carry a central load. As vehicle bumpers often experience eccentric loads, the I-beams inability to handle these loads has prevented their being used in bumper applications. For example, the bumper disclosed in U.S. Pat. No. 4,482,180 disclosed the use of an I-beam as one of the supports which can be used in the practice of the invention. If an ordinary I-beam were used, however, one would expect the front wall to collapse if it encountered an eccentric load. This is because the patent does not teach or suggest the use of any reinforcement for the front wall.

Hollow beam sections, on the other hand, can carry eccentric and central loads since they also have sections that resist torsion. For central loads, I-beams and hollow beams of equal area have equal load capacity.

C-section bumper failure often occurs with some buckling of the horizontal walls. This indicates that the ultimate load for a C-section bumper is lower than the ideal load and is also difficult to predict. This lack of predictability is due to the fact that no specific buckling area is designed into the bumper. As a result, the design safety factor for a C-section bumper must be larger than for an I-beam section. The buckling of the C-section bumper can be reduced by the addition of material to the bumper. While this increases the stiffness of the bumper, it is not as cost effective as shifting to a hollow beam or I-beam construction.

A major disadvantage of both the C and closed sections is that two walls are used to carry the span load. For bumper beam applications, this means that each of the horizontal walls of the beam must be capable of withstanding a substantial portion of an eccentric load (high and low hits) therefore increasing beam weight. Increased beam weight means increased construction costs in the form of additional materials used and also reduces the fuel efficiency of the vehicle by adding to the overall weight of the vehicle.

SUMMARY OF THE INVENTION

It is an object of this invention to provide a bumper system which is light weight yet capable of withstanding a low speed impact. It is another object of the invention to provide a light weight bumper which is constructed of one type of material and which can be formed in a single step reducing construction costs. It is a further object of the invention to provide such a bumper which also is capable of absorbing a significant portion of the kinetic energy of a low speed impact.

The bumper of the invention consists of an I-beam constructed of fiber reinforced thermoplastic or thermoset reinforcing resin. Ribs help pass eccentric loads from the front of the beam to the rear wall to prevent bending of the front wall. They also help prevent local failure of the front wall in the event of eccentric, concentrated loads such as impact with a pole or a tree. Proper rib orientation also increases torsional stiffness making the I-beams torsional performance similar to that of a hollow beam.

DETAILED DESCRIPTION OF THE INVENTION

The bumper of the present invention incorporates all of the structural advantages of an I-beam while minimizing the disadvantages discussed above. In its simplest form, the invention comprises an I-beam formed from reinforced thermoplastic or thermoset resins with a series of ribs connecting the front and rear walls of the I-beam. The bumpers weigh significantly less than conventional bumper assemblies currently used yet are capable of withstanding equivalent or higher loads.

Figure 1:
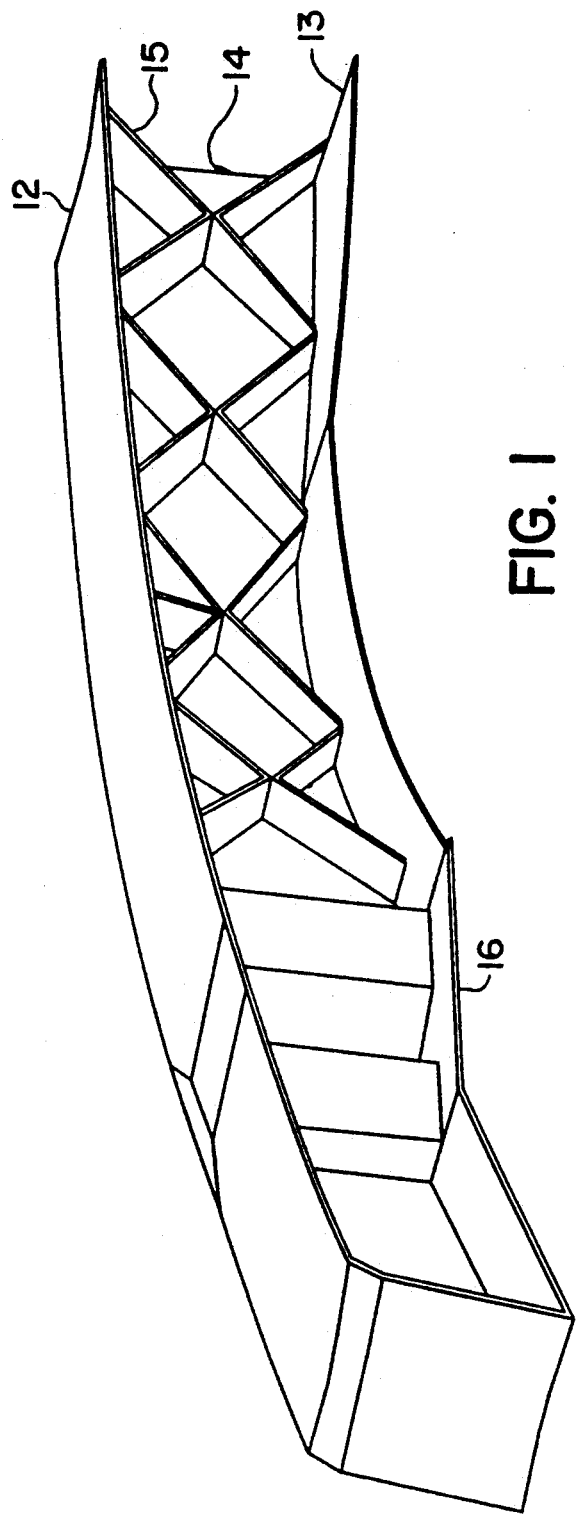
FIG. 1 is an isometric view of the left half of a bumper beam of the invention.

FIG. 1 shows a top perspective of the left half of a bumper of the invention. In this embodiment, the I-beam is slightly curved to accommodate the desired aerodynamic design of the vehicle. The bumper consists of a vertical front wall 12, a vertical rear wall 13 and a horizontal cross member or web 14 which forms the I-beam shape. One or more reinforcing ribs 15 are provided running from the front 12 to rear 13 walls. The ribs 15 run the length of the bumper between the two mounting points 16. Optionally, the ribs may extend into the bumper corner to add additional corner support.

The ribs can be arranged in any pattern or orientation which provides support to the front wall. In the preferred embodiment, the ribs are placed in a cross pattern with the ribs perpendicular to the horizontal member. A cross or x shaped pattern has been found to provide the maximum support for the front wall and maximum torsional stiffness. The ribs also allow reduction in the thickness of the web adding to overall weight reduction.

The ribs extend both above and below the web providing support to both the upper and lower portions of the front wall. The ribs should be of sufficient height to provide support to the front wall. Other factors, such as die tooling limitations may also restrict the height of the ribs.

Spacing of the ribs is also important. The distance between the points at which the ribs meet the front wall should be close enough to support the wall but not so close that overall weight is increased without meaningful gain in strength. The number and spacing of the ribs will also depend on the desired strength of the bumper and its overall length. For example, for a 1300 millimeter length bumper designed for use with a full size car, it has been found that nine sets of ribs spaced 100 millimeters apart provides sufficient support to allow the bumper to withstand up to 14,000 pounds of static force and to pass the industry standard dynamic load testing.

The ribs serve several functions. In the centrally loaded condition, they serve as stabilizers for the center span. This means that the center span does not have to withstand buckling or local vertical bending. Therefore load capacity of the beam has a much tighter tolerance. The ribs when used in a cross pattern help prevent vertical rotation of the beam when an eccentric impact occurs. The cross pattern ribs also act as stabilizers for the front wall. For eccentric loading, the ribs pass the load to the rear wall as necessary thus preventing bending or vertical rotation of the front wall. The ribs also prevent local failure of the front wall due to eccentric concentrated loads.

Figure 2:
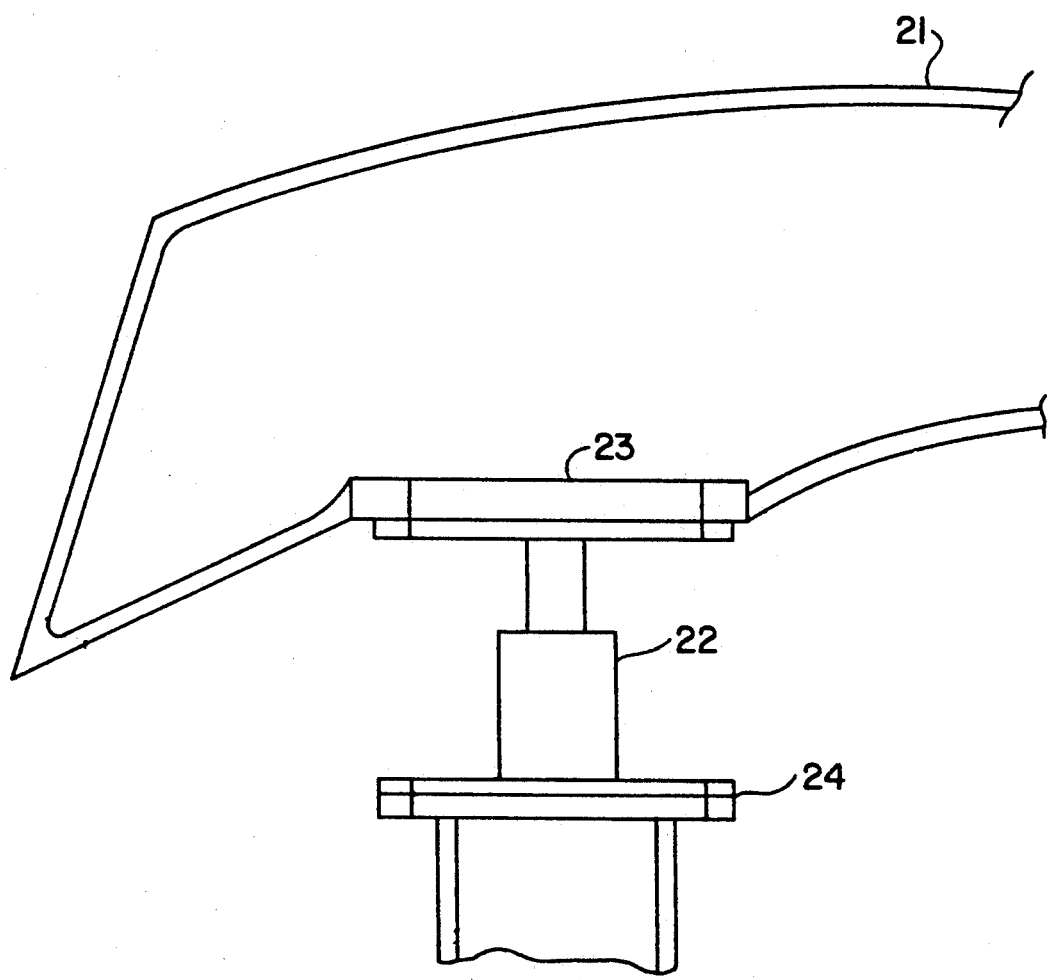
FIG. 2 is a schematic view of a potential mounting system for a bumper beam of the invention.

The I-beam bumper of the invention is designed to be used with a standard impact absorbing system. FIG. 2 shows a typical input absorbing system for one half of the bumper. It will be understood by those in the art that an identical impact absorbing system will be used for the opposite half of the bumper. The bumper 21 is attached to an impact absorber 22 at the mounting point 23 of the bumper. The mounting point 23 can be reinforced to provide for secure mounting of the bumper to the absorbers. The absorber 22 is in turn mounted to the vehicle frame 24. Typical absorbers are either hydraulic or pneumatic shock absorbers, however, other mounting systems are known including foam or absorber blocks.

The bumpers of the invention may also comprise a covering member which shields the interior portion of the I-beam. The covering member provides styling and definition for the bumper system and prevents dirt and moisture from collecting in the I-beam.

Use of the reinforced I-beam of the invention allows for considerable weight savings and increased fuel efficiency as well as overall cost reduction. Currently, a typical bumper construction for a vehicle such as a Ford Continental ® or Buick LeSabre ® weighs approximately 23 pounds and uses an energy absorbing system which weighs approximately 11 pounds bringing the total system weight to 34 pounds. A bumper of the present invention with equivalent or superior impact performance weighs approximately 9 pounds. When used with the same energy absorbing system as the conventional bumper the total system weight is 20 pounds or approximately 40% less weight than a conventional bumper. For example, typical bumpers of the invention weighing approximately 7.8 pounds can withstand static loads of over 8000 pounds. A conventional C-shaped bumper would have to weigh over 10 pounds to withstand the same load.

Weight savings can also be achieved by adjusting the thickness of the various parts of the bumper so as to maximize them for transferrence and absorption. For example, in the preferred embodiment, the front wall is thickest at the center portion of the beam and thins gradually as the wall moves towards the ends. The web on the other hand is thinnest in the center and thickest at the ends near the mounting points. For example, in a bumper for a full sized vehicle, the thickness of the front wall may vary from as thick as 9.5 millimeters at the center to 5 millimeters at the ends. The web in the same bumper which has a thickness of about 5 millimeters at the center to about 10 millimeters at the ends. A C-section bumper made of equivalent materials and which is marginally capable of withstanding equivalent forces has an overall wall thickness of up to 16 millimeters.

The bumper can be fabricated from any suitable reinforced thermoplastic or thermoset material. The material should be such that the reinforcing material is uniformly distributed throughout the molded beam to provide uniform strength throughout the beam. Typical thermoplastic resins which can be used in the practice of this invention include polyolefins (polyethylene, polypropylene and copolymers), vinyl polychloride, polystyrene and copolymers, polyamide, saturated polyester, polyphenylene ether, polycarbonates and plastic alloys. Typical thermoset resins include: polyesters, vinyl esters, epoxides, sheet molding compound and bulk molding compound.

The reinforcing fibers used in the composition have their physical structures unchanged after the bumpers are formed. They can be selected from the group comprising: glass fibers, carbon fibers, ceramic fibers, boron fibers, glass wool, rock wool, metallic fibers, synthetic organic fibers of high melting point (aromatic polyamides, polyesters and others). Several types of fiber can be used in the same starting material.

One particularly good material for fabricating bumper of the invention is a glass fiber reinforced polypropylene manufactured by Exxon Chemical Company and sold under the trademark TAFFEN ®. The procedures for preparing this material and its properties are discussed in U.S. Pat. No. 4,913,774, Publish European Patent Application 88 402414.2 and Publish International Application PCT/EP91/00021.

Beams of the present invention constructed using TAFFEN ® thermoplastic materials are shaped using a compression molding process. In this process, a predetermined amount of TAFFEN ® is preheated to about 440° F. It is then transferred to a compression molding tool where the bumper is formed. As pressure is applied, the TAFFEN ® becomes a viscous liquid and flows within the tool. Downward movement of the press is stopped when the tool is completely filled with molten TAFFEN ®. The pressure is then increased to up to 2000 psig and a dwell period is begun. During this dwell period, the material is allowed to cool.

While the above method is preferred for bumpers fabricated from TAFFEN ®, it will be readily apparent to those skilled in the art that other manufacturing techniques are possible depending upon the nature of the materials used. For example, if a thermoset material is used in a compression molding process, preheating does not occur. However, post mold heating is required. In addition, the pressure required to ensure flow of the material throughout the tool may also vary.

Using the materials and techniques described above, the bumpers of the invention can be formed in a single processing step. Other than possible trimming of excess material, and secondary operations such as the drilling of bolt holes, no additional tooling or processing is required unlike some conventional bumpers which comprise several different components fabricated from different materials.

BUMPER TESTS

A series of bumper tests were conducted by comparing the performance of the bumper of the invention with a conventional C-shaped bumper. The I-beam bumpers were constructed of TAFFEN ® in the manner described above and the C-shaped bumper was constructed of TAFFEN ® and equivalent materials.

Figure 3:
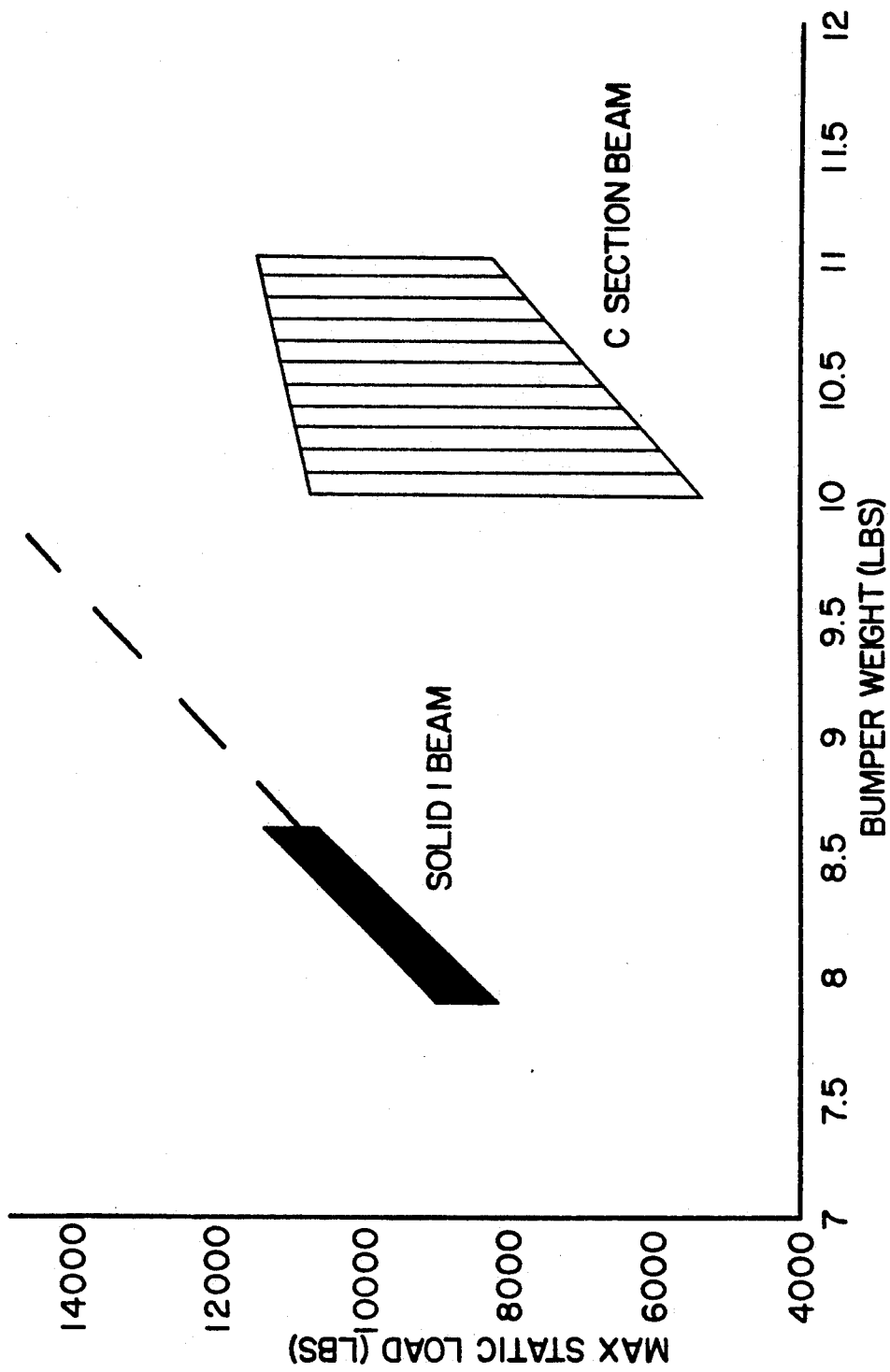
FIG. 3 is a graph showing the pounds to failure for I-beams of the invention versus a conventional bumper during static testing.

The first test conducted was a static load test. In these tests, the bumpers were subjected to an increasing span load until the bumper failed. FIG. 3 shows the compilation of test results for approximately 200 tests of C and I-beam configurations. As seen in FIG. 3, the bumpers constructed according to the above disclosure withstood equal or greater static loads than C-beams weighing significantly more. An I-beam bumper of the invention weighing approximately eight pounds can withstand a static load of over 8000 pounds. To obtain equivalent performance from a C-section bumper, the bumper would have to weigh over ten pounds. Furthermore, I-beam bumpers of the invention exhibited significantly less load bearing capacity variation than C-shaped bumpers.

A second series of comparative tests were run. In this series, C-section and I-beam bumpers were subjected to dynamic testing based on a modified version of Federal Test Requirements (FMVSS 581). The modification was that a speed of 5 mph was used in lieu of 2.5 mph as specified in the test. The modification reflects current industry standard testing. In this test, the bumpers were mounted on a car or test cart and were struck at a speed of 5 mph by a test pendulum five times at various locations along the bumper including center, outboard and corner locations. Vertical location of the strikes was also varied. A bumper is said to pass the test if the vehicle itself sustains no damage to the safety components of the vehicle such as the lights, hood, and fenders. That the bumper itself is damaged is of no consequence as long as the other components are not damaged.

After numerous test runs at various vehicle weights, the I-beam was seen to perform as well or better than a C-section beam weighing over 50% more.

In a final series of tests, the I-beam bumpers of the invention was subjected to a 5 mph impact with a 7" diameter pole. This test was performed in accordance with the National Insurance Institute Guidelines. The test is designed to evaluate bumper performance at low speed impacts against a concentrated load. After the pole impact, the vehicle and bumper were then subjected to the 5 mph dynamic test described above. A bumper can be said to pass this test if it survives the pole impact and passes the dynamic impact test. A series of 7" pole tests were conducted using bumpers of the invention. All the test bumpers of the invention passed the test.

As seen from this data, the bumper of the invention performs as well or better than conventional bumpers with a significant reduction in overall weight.

What we claim is:

1. A light weight vehicle bumper comprising:
   a front wall;
   a rear wall;
   a horizontal cross member connecting said front and rear walls and at least one reinforcing rib connecting said front and rear walls, the axis of said rib being perpendicular to said cross member so as to provide support to said front wall.

2. The bumper of claim 1 wherein said bumper is fabricated from a fiber reinforced thermoplastic material.

3. The bumper of claim 2 wherein said thermoplastic material is polypropylene.

4. The bumper of claim 2 wherein said fiber is selected from the group comprising unoxidizable steel fibers, aluminized glass fibers cellulosic fibers, or glass fibers.

5. The bumper of claim 1 wherein said bumper is fabricated from a thermoset material.

6. The bumper of claim 1 wherein said bumper can withstand a 5 mph dynamic impact bumper test.

7. The bumper of claim 1 further comprising a covering member.

8. A vehicle bumper system comprising
(a) a light weight bumper beam comprising: a front wall, a rear wall, a horizontal cross member connecting said front and rear walls and at least one reinforcing rib connecting said front and rear walls, the axis of said rib being perpendicular to said cross member so as to provide support to said front wall; and
(b) an impact absorbing system.

9. The bumper system of claim 8 further comprising a covering member for said I-beam.

10. The bumper system of claim 8 wherein said I-beam is fabricated from a fiber reinforced thermoplastic material.

11. The bumper system of claim 8 wherein said I-beam is fabricated from a thermoset material.

12. The bumper system of claim 8 wherein said impact absorbing system comprises hydraulic shock absorbers.

* * * * *